(12) United States Patent
Lu et al.

(10) Patent No.: US 7,538,844 B2
(45) Date of Patent: May 26, 2009

(54) MULTI-DOMAIN IN-PLANE SWITCHING LIQUID CRYSTAL DISPLAYS WITH INTERLEAVED COMMON AND PIXEL CHEVRON-SHAPED ELECTRODES IN BOTH HORIZONTAL AND VERTICAL DIRECTIONS TO DIVIDE ELECTRODE STRUCTURE INTO TWO REGIONS

(75) Inventors: Ruibo Lu, Orlando, FL (US); Shin-Tson Wu, Oriedo, FL (US); Qi Hong, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 694 days.

(21) Appl. No.: 11/119,157

(22) Filed: Apr. 29, 2005

(65) Prior Publication Data

US 2006/0244885 A1    Nov. 2, 2006

(51) Int. Cl.
  *G02F 1/1343* (2006.01)
(52) U.S. Cl. .................. 349/141; 349/129; 349/130
(58) Field of Classification Search ................ 349/129, 349/130, 141
  See application file for complete search history.

(56) References Cited

U.S. PATENT DOCUMENTS

| | | | |
|---|---|---|---|
| 6,128,061 A | 10/2000 | Lee et al. | 349/141 |
| 6,177,973 B1 | 1/2001 | Lee et al. | 349/123 |
| 6,266,116 B1 | 7/2001 | Ohta et al. | 349/141 |
| 6,342,938 B1 * | 1/2002 | Song et al. | 349/143 |
| 6,812,986 B2 * | 11/2004 | Takatori et al. | 349/141 |
| 7,023,516 B2 * | 4/2006 | Yoshida et al. | 349/143 |
| 2003/0086044 A1 | 5/2003 | Inoue et al. | |
| 2004/0233343 A1 | 11/2004 | Baek | |
| 2004/0257512 A1 | 12/2004 | Yoo et al. | |
| 2004/0265510 A1 | 12/2004 | Miroshin et al. | |
| 2005/0151912 A1 * | 7/2005 | Miyachi et al. | 349/141 |

OTHER PUBLICATIONS

S. Yeo, "A LC Display for the TV Application", SID 2004 Digest, (2004) p. 758.
R. A. Soref, "Transverse Field Effects in Nematic Liquid Crystals", Applied Physics Letters, vol. 22, pp. 165-166 (1973).

(Continued)

*Primary Examiner*—David Nelms
*Assistant Examiner*—John Heyman
(74) *Attorney, Agent, or Firm*—Brian S. Steinberger; Phyllis K. Wood; Law Offices of Brian S. Steinberger, P.A.

(57) ABSTRACT

A multi-domain in-plane-switching liquid crystal display with small color shift, wide viewing angle and fast response. The structure of the multi-domain in-plane switching liquid crystal displays comprises plural chevron-shaped common electrodes and chevron-shaped pixel electrodes, arranged alternatingly to form a multi-domain liquid crystal distributions. In an embodiment the structure includes a polarizer and an analyzer and the liquid crystal material is homogenously aligned. In another embodiment the structure includes alignment films for vertically aligning the liquid crystal material and crossed linear polarizers, circular polarizers or a combination of linear polarizers and compensation film. In another embodiment, the multi-domain in-plane switching liquid crystal display provides at least two different uniformly aligned liquid crystal domains, for a double multi-domain-In-plane switching LC display.

18 Claims, 14 Drawing Sheets

OTHER PUBLICATIONS

R.A. Soref, Field Effects in Nematic Liquid Crystals Obtained with Interdigital Electrodes, Journal of Applied Physics vol. 45, p. 5466 (1974).

Kiefer, et al., "In-Plane Switching of Nematic Liquid Crystals", Japan Display '92 (1992) p. 547.

W. Liu, et al., "Electro-optical Performance of a Self-Compensating Vertically-Aligned Liquid Crystal Display Mode", Jpn. J. Appl. Phys. vol. 38 (1999) pp. 2779-2784.

Y. Saitoh et al., "Optimum Film Compensation of Viewing Angle of Contract in In-Plane Switching-Mode Liquid Crystal Display", Japanese Journal of Applied Physics, vol. 37 (1998), p. 4822.

S. Aratani, et al., "Complete Suppression of Color Shift in In-plane Switching Mode Liquid Crystal Displays with a Multidomain Structure Obtained by Unidirectional Rubbing", Japanese Journal of Applied Physics, vol. 36 (1997), p. L27.

* cited by examiner

MULTI-DOMAIN IN-PLANE SWITCHING LIQUID CRYSTAL DISPLAYS WITH INTERLEAVED COMMON AND PIXEL CHEVRON-SHAPED ELECTRODES IN BOTH HORIZONTAL AND VERTICAL DIRECTIONS TO DIVIDE ELECTRODE STRUCTURE INTO TWO REGIONS

This invention relates to the structure of in-plane switching liquid crystal displays, and more specifically to the structure of a liquid crystal display with chevron-shaped electrodes that form the multi-domain liquid crystal distributions with small color shift, wide viewing angle and fast response.

BACKGROUND AND PRIOR ART

Liquid crystal displays (LCDs) have been widely used in the mobile displays, notebook computer panels, personal computer (PC) monitors and TVs. Fast response, high contrast ratio, high transmittance and wide viewing angle without color reversal are the main problems for getting high display quality, which is critical in large size monitors and TV applications. As one of the promising candidates, in-plane switching (IPS) mode liquid crystal display has been introduced for getting the high display quality in these areas because of its inherent wide viewing angle properties as described in S. Yeo, A LC Display for TV Application, SID 2004 Digest, (2004), p. 758.

The in-plane switching concept was first published in R. A. Soref, Transverse Field Effects in Nematic Liquid Crystals, Applied Physics Letters, vol. 22, (1973), p. 165 and, Field Effects in Nematic Liquid Crystals Obtained with Interdigital Electrodes, Journal of Applied Physics vol. 45, (1974), p.5466. In 1992, Kiefer et al, In-Plane Switching of Nematic Liquid Crystals, Japan Display '92, (1992), p.547. extended the operating principle to display devices and later Hitachi Japan developed the in-plane switching concept into commercial products. In an in-plane switching liquid crystal display, the electric field is applied in the transversal direction from the pixel electrode and the common electrode which are located on the same substrate. The liquid crystal molecules between the neighboring electrodes are rotated in the same plane. This is why the in-plane switching mode LCD exhibits a wide viewing angle. Unfortunately, the off-axes light leakage of the crossed polarizers at the oblique incident angles deteriorates the wide viewing angle properties of conventional in-plane switching LCDs using the stripe-shaped electrodes. Moreover, since the LC molecules between the electrodes are uni-directionally orientated, a color-shift phenomenon occurs and degrades the image quality when viewed at large incident angles. In addition, the response time of a 4-μm in-plane switching liquid crystal cell is slow, approximately 50 ms when a special driving circuit and proper LC material design.

To solve the off-axes light leakage of the crossed polarizers problem and to widen the viewing angle of the in-plane switching LCDs, J. Chen et al., Optimum Film Compensation Modes for TN and VA LCDs, SID 98 Digest, (1998) p. 315 and Y. Satoh et al., Optimum Film Compensation of Viewing Angles of Contrast in In-Plane-Switching-Mode Liquid Crystal Display, Japanese Journal of Applied Physics, vol. 37 (1998), p. 4822 discloses use of uniaxial films and biaxial films for compensation. However, the results were not very promising.

In an attempt to suppress the shortcoming of the color-shift problem, S. Aratani et al., Complete Suppression of Color Shift in In-Plane Switching Mode Liquid Crystal Display with Multi-domain Structure Obtained by Unidirectional Rubbing, Japanese Journal of Applied Physics, vol. 36 (1997), p. L27, describes use of a zig-zag electrode with a multi-domain structure. A similar solution was disclosed in U.S. Pat. No. 6,266,116, issued to M. Ohta et al on Jul. 21, 2001. A solution for preventing the color shift in in-plane switching LCDs is described in U.S. Pat. No. 6,128,061 issued to Lee et al. on Oct. 3, 2000. The LCD comprises of a rectangular frame main electrode and the dividing electrodes to divide the electrodes into sub-pixels in both the vertical and the horizontal directions.

Recently, a LCD mode that combines IPS and vertical alignment (VA) concepts was described by W. Liu et al., Electro-optical Performance of a Self-Compensating Vertically-Aligned Liquid Crystal Display Mode, Japanese Journal of Applied Physics, vol. 38 (1999), p. 2779 and a similar device configuration was disclosed in U.S. Pat. No. 6,177,973 issued to S. Lee et al. on Jan. 23, 2001. The in-plane field can incur the deformation transition of vertical alignment and the liquid crystal molecules with the positive dielectric anisotropy can be used. It has the advantages of fast response and wide viewing angle ability when used in conjunction with the appropriate compensation films.

SUMMARY OF THE INVENTION

A primary objective of the invention is to provide the chevron-shaped multi-domain in-plane switching (MD-IPS) mode LCD.

A secondary objective of the invention is to provide the chevron-shaped multi-domain in-plane switching mode liquid crystal display (LCD) having a small color shift.

A third objective of the invention is to provide the chevron-shaped multi-domain in-plane switching mode LCD having a fast response time.

A fourth objective of the invention is to provide the chevron-shaped multi-domain in-plane switching mode LCD having a wide viewing angle.

A fifth objective of the invention is to provide the chevron-shaped multi-domain in-plane switching mode LCD having a high contrast ratio.

The multi-domain in-plane switching liquid crystal display of the present invention includes a first and second substrate, an electrode structure having plural chevron-shaped electrodes, and alignment layers on each substrate. A liquid crystal material is sandwiched between the alignment layers that aligns the liquid crystal material and polarizers are disposed on exterior surfaces of the substrates to provide a multi-domain in-plane switching liquid crystal display with small color shift, wide viewing angle and fast response. The liquid crystal material has either a positive or a negative dielectric anisotropy.

The chevron shaped electrodes are formed in both a horizontal and vertical direction forming a bending angle, an angle between a chevron arm extensional direction and one of a horizontal and a vertical direction, within a range of approximately 0 degrees to approximately 90 degrees, preferably approximately 45 degrees. The bending angle divides said electrode structure into at least two regions to suppress said color shift. The polarizers are either linear or circular, or a combination thereof, and may optionally include broadband quarter-wave compensation film between alignment film and the polarizer for vertical alignment of the liquid crystal. The compensation films may be a combination of a positive birefringence and a uni-axial birefringence; a combination of a negative birefringence and a uni-axial birefringence; or an a-plate compensation film and a c-plate compensation film.

Further objectives and advantages of this invention will be apparent from the following detailed descriptions of the presently preferred embodiments that are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
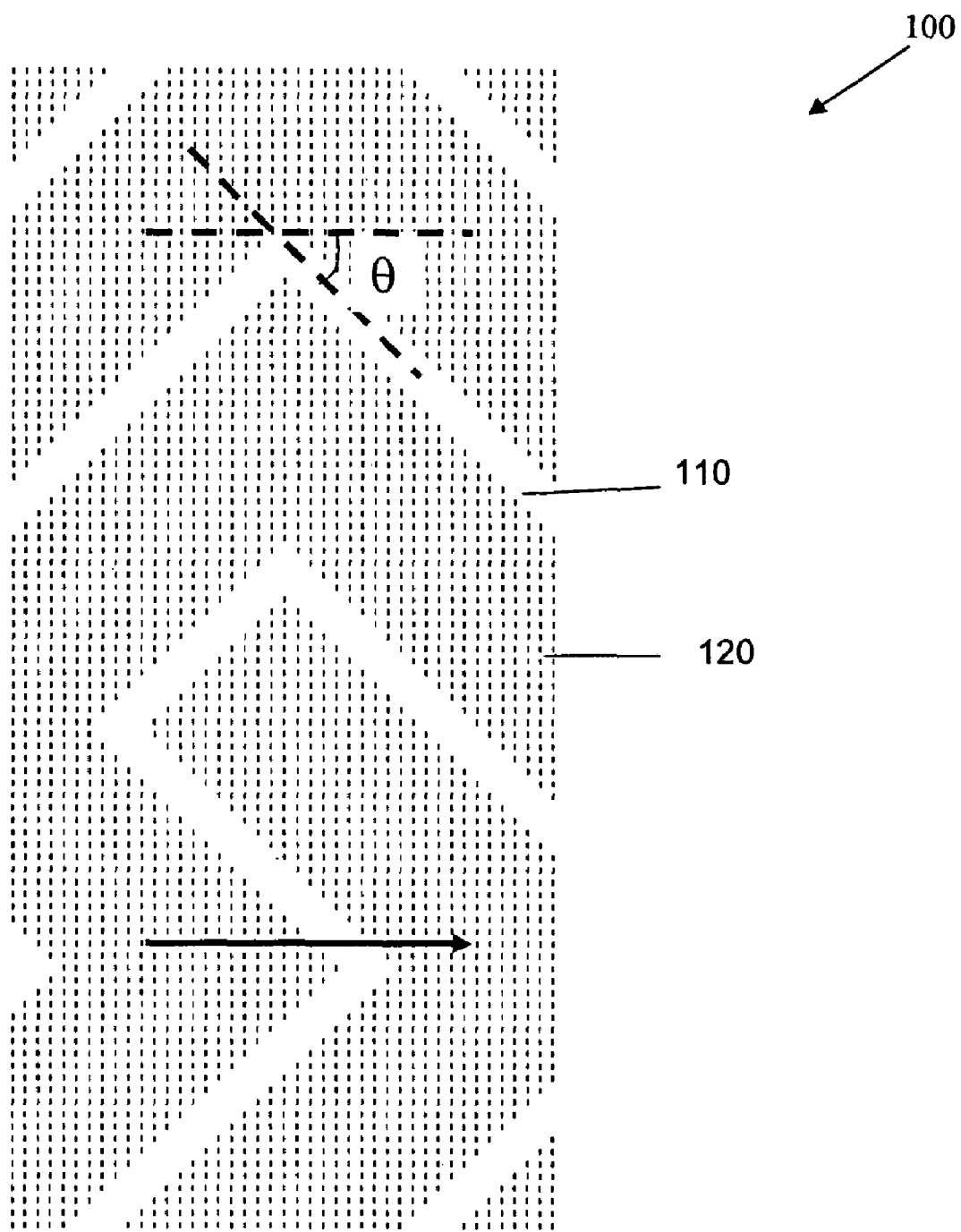
FIG. 1 shows a general electrode structure of a chevron-shaped multi-domain in-plane switching liquid crystal display.

100 electrode structure
110 common electrode
120 pixel electrode
200 multi-domain in-plane-switching device
210 top substrate
212 top polarizer
220 liquid crystal directors
230 bottom substrate
232 bottom polarizer
300 multi-domain in-plane-switching device
314 second linear polarizer
318 second wide band quarter wave film
320 vertically aligned liquid crystal
330 first linear polarizer film
332 first wide band quarter wave The apparatus, method, system and device of the present invention provides a new liquid crystal display structure for achieving small color shift, fast response time, high contrast ratio and wide view using chevron-shaped electrodes in multi-domain in-plane-switching liquid crystal display, where both positive ($\Delta \epsilon > 0$) and negative dielectric ($\Delta \epsilon < 0$) LC materials can be used, and both the homogenous and vertical liquid crystal alignment can be operated. FIG. 1 shows a typical electrode structure 100, where θ is the bending angle of the chevron-shaped electrodes. The arrow indicates the liquid crystal alignment direction. The electrode structure consists of the chevron-shaped electrodes in both the horizontal and vertical directions which divide the electrode structure into at least two different regions. A series of chevron-shaped common electrodes 110 and chevron-shaped pixel electrodes 120 are alternately arranged to form interdigital electrodes on a substrate, which are connected to the thin-film transistors (not shown). At the boundary of the different regions, the common electrodes 110 and the pixel electrodes 120 occupy neighboring space for fully transverse switching to improve the transmittance and aperture ratio. The multi-domain in-plane-switching device of the present invention can be regarded as consisting of two different IPS, where one is in the horizontal direction and the other one is in the vertical direction. At the neighboring region of the device, the common electrodes 110 and the pixel electrodes 120 are still interleaved as shown in the center part of FIG. 1. An additional electrode or spacers for the separation is not required.

Figure 2:
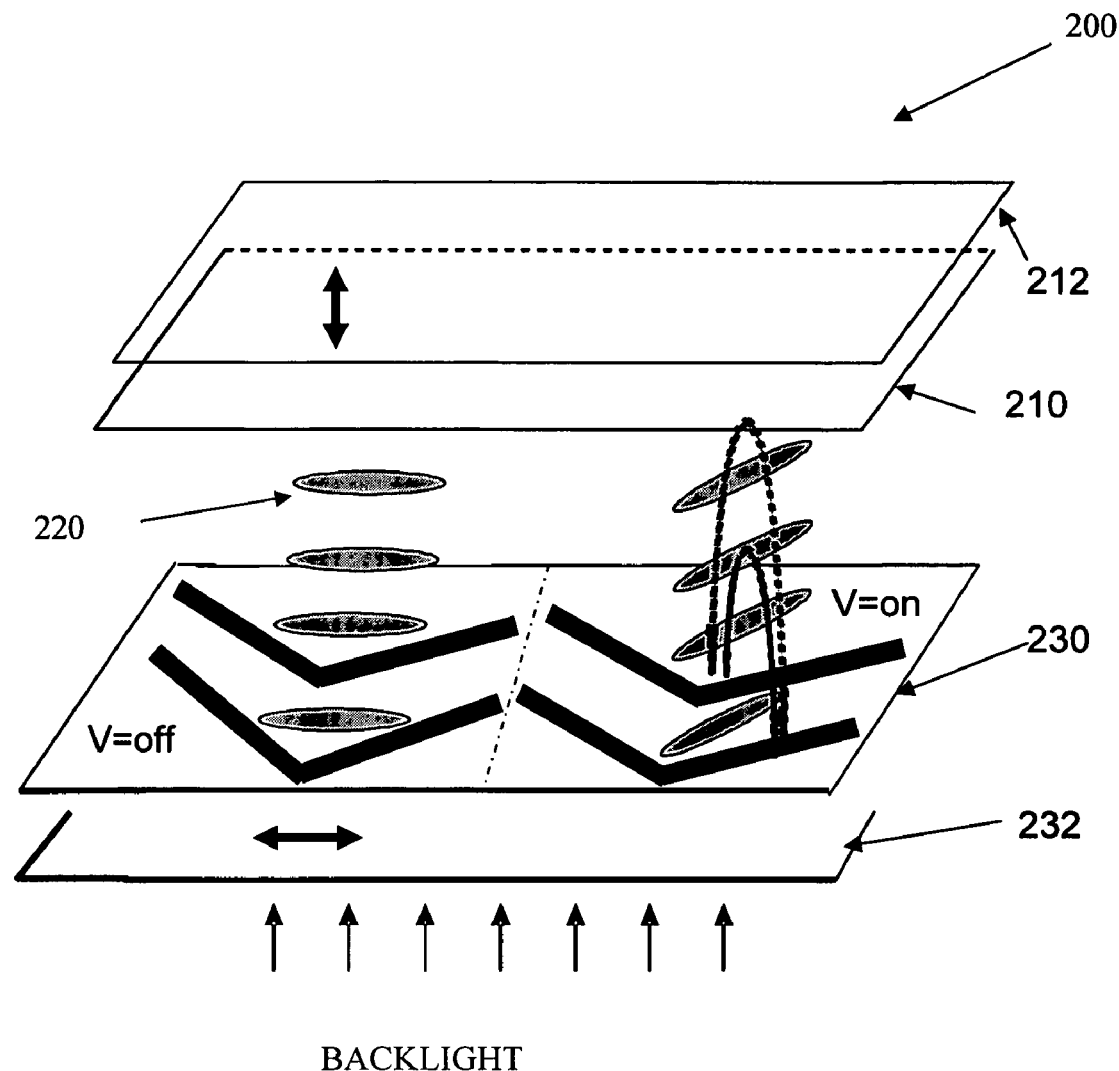
FIG. 2 is a plan view of a general device structure of a chevron-shaped multi-domain in-plane switching liquid crystal display using homogeneously aligned liquid crystals.

For multi-domain in-plane-switching LCDs 200 having homogeneously aligned liquid crystals as shown in FIG. 2, the liquid crystal molecules 220 are aligned homogeneously on the glass or plastic top and bottom substrates 210, 230. The bending angle θ of the chevron-shaped electrodes, which is the angle between the chevron arm extension direction and the horizontal or vertical direction as shown in FIG. 1, is theoretically any non-zero value. The rubbing direction is preferably along the horizontal or vertical direction, which is 0° or 90°, for the symmetric multi-domain formation. The principal axis of the linear polarizer 232 is parallel to the liquid crystal 220 alignment (i.e., rubbing) direction. When voltage is not applied, the incident light is blocked by the crossed polarizers 232 and 212, which results in a normally black state. When the applied voltage exceeds a threshold, the in-plane electric field is created and the electric field lines are in the parabolic form as shown in FIG. 2. Correspondingly, the liquid crystal directors with positive dielectric anisotropy, $\Delta\in > 0$, are reoriented following the direction of the electric field, and the liquid crystal directors with negative dielectric anisotropy, $\Delta\in < 0$ are reoriented perpendicular to the direction of the electric field and light transmits through the crossed polarizers 232 and 212.

Figure 3:
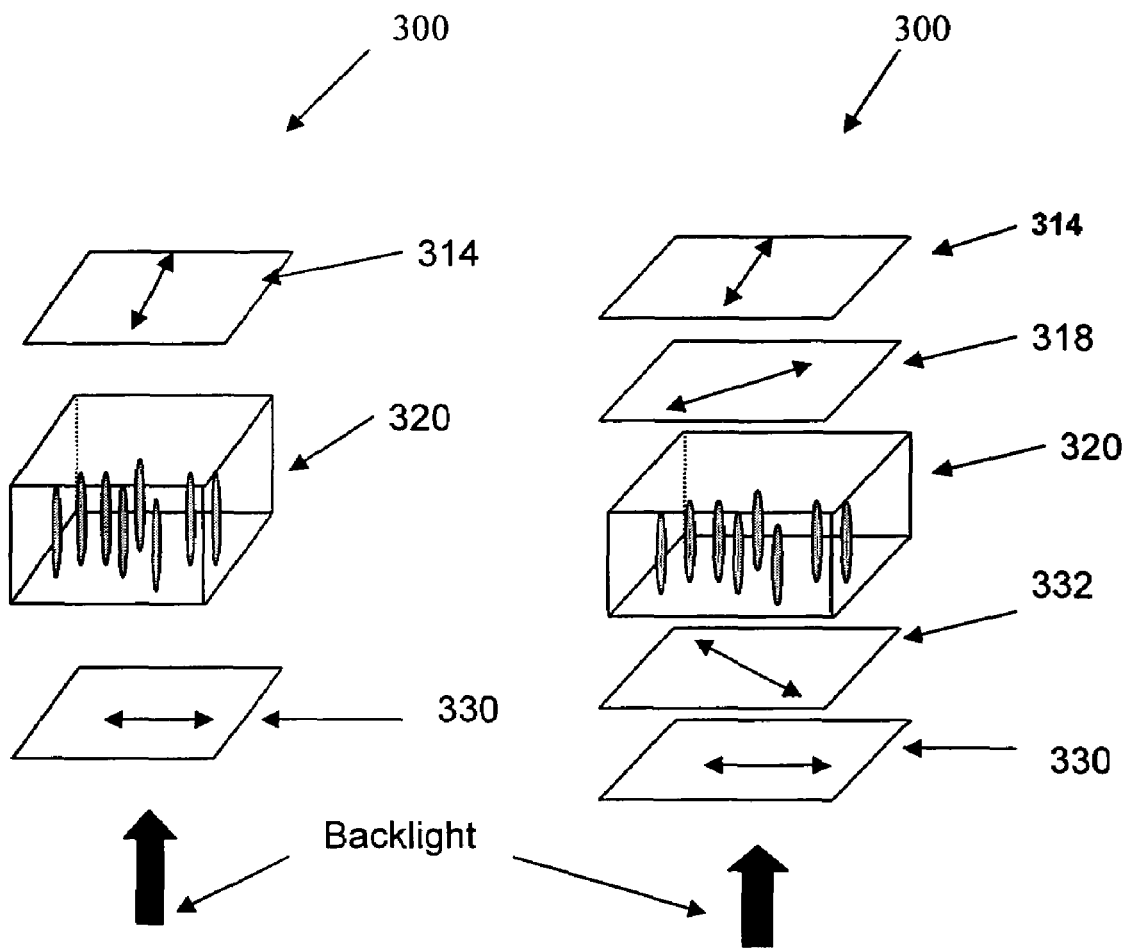
FIGS. 3a and 3b are plan views of a general device structure of a chevron-shaped multi-domain in-plane switching liquid crystal display using vertically aligned liquid crystals.

As for the multi-domain in-plane-switching LCD 300 using the vertically aligned liquid crystals 320 as shown in FIG. 3, the liquid crystal molecules 320 are aligned perpendicularly on the glass or plastic substrates (not shown) and the device is in the vertical alignment mode at null voltage state. An additional rubbing process is not required and the polarizer 330 used is either a linear polarizer or the circular polarizer. In this example, only the positive dielectric ($\Delta\in > 0$) LC materials is adopted. Referring first to FIG. 3a, for a device using the linear polarizers, the principle axes of the polarizers 314, 330 is set at 90°, i.e. the linear polarizers are crossed. "Referring to FIG. 3b, two broadband quarter-wave films 318, 332 are placed before and after the crossed linear polarizers 314, 330, respectively, which form the circular polarizers."

The principal axis of the first linear polarizer 330 and the first broadband quarter-wave film 332 is arranged at 45° to form the front circular polarizer having a left-hand circularity. Similarly, the principal axis of the second linear polarizer 314 and the second broadband quarter-wave film 318 is arranged at 45° to form the rear circular polarizer with a corresponding right-hand circularity.

To explain the working mechanism of the vertical alignment mode multi-domain in-plane switching LCD, a device having linear polarizers is used as an example. When a voltage is not applied, the incident light is blocked by the crossed linear polarizers and a dark state is obtained. When voltage is applied, the liquid crystal directors between the chevron-shaped electrodes reorient along the in-plane electric field and phase retardation appears from the liquid crystals. Therefore, the crossed linear polarizers transmit light.

Figure 4:
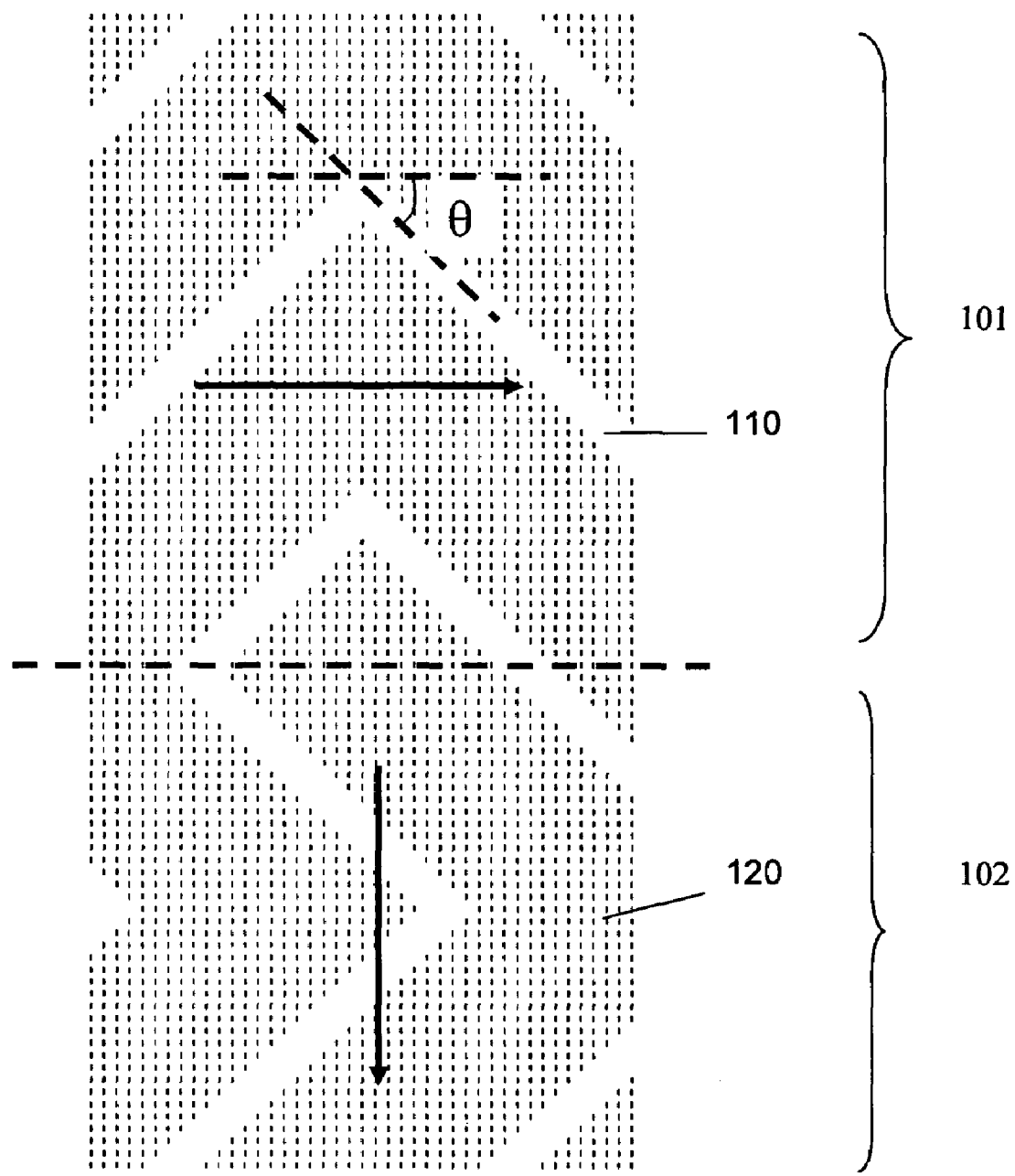
FIG. 4 shows a general electrode structure of a chevron-shaped MD-IPS LCD with two uniformly aligned LC domains.

The drawback of the prior art multi-domain in-plane switching LCD is its relatively low transmittance since the effective phase retardation is reduced when compared to conventional in-plane switching LCD. To improve the light transmittance, the apparatus, method, system and device of the present invention uses a chevron-shaped multi-domain in-plane switching mode structure with two aligned liquid crystal domains 101, 102 as shown in FIG. 4. The arrow indicates the liquid crystal alignment directions and θ is the bending angle of the chevron-shaped electrodes. The electrode structure is divided into two parts 101, 102, each having different aligning directions which are typically perpendicular. The initial aligned liquid crystal domains are obtained by a double rubbing method, a photo-alignment method, or the inkjet printing process. Since the chevron-shaped multi-domain in-plane switching LCD with two aligned LC domains can be regarded as two separate in-plane switching LCD working simultaneously, the operation is similar to the above multi-domain in-plane-switching LCD using the homogeneously aligned liquid crystals as shown in FIG. 3. When the principal axis of the linear polarizer is parallel to the liquid crystal alignment direction in one aligned liquid crystal domain, the principle axis is perpendicular to the liquid crystal alignment direction in the other aligned liquid crystal domain. When a voltage is not applied, the incident light is blocked by the crossed linear polarizers, which results in a normally black state. When the applied voltage exceeds a threshold, the in-plane electric field is created and light transmits through the crossed linear polarizers.

For explanation and comparison purposes, following three embodiments are described using $\Delta\in > 0$ LC materials and the embodiments are described using specific liquid crystal materials although alternative liquid crystal material may be substituted.

Embodiment 1

FIGS. 1 and 2 illustrate the typical chevron-shaped electrode structure and the corresponding device structure and operation when using the homogeneously aligned liquid crystals. The electrode structure 100 consists of the chevron-shaped electrodes in both the horizontal and vertical directions which divides the electrode structure into at least two regions. A series of chevron-shaped electrodes are alternatively arranged to form the inter-digital electrodes on the same substrate as the common electrode 110 and the pixel electrode 120, respectively, which are connected to the thin-film transistors (not shown). The common electrode 110 and the pixel electrode 120 can be formed using the same photolithography process, or prepared respectively and separated by passivation layers such as $SiO_2$. The distance between adjacent common electrodes 110 and pixel electrodes 120 can be larger than the cell gap for in-plane switching or smaller than the cell gap to take advantage of the fringe field effect. At the boundary of the different regions, the common electrodes 110 and the pixel electrodes 120 occupy the neighboring space for fully transverse switching to improve the transmittance and aperture ratio. An additional electrode or spacers for the separation is not required. The bending angle θ of the chevron-shaped electrodes, which is the angle between the chevron arm extensional direction and the horizontal or vertical direction as shown in FIG. 1, is be any non-zero value. To eliminate the color shift phenomenon, it is preferably approximately 45°. The rubbing direction is preferable along the horizontal or vertical direction, which is 0° or 90°, for the symmetric multi-domain formation.

In the first embodiment, the bending angle θ of the chevron-shaped electrodes is approximately 45°, with a rubbing angle of approximately 0° and a chevron arm length of approximately 35 μm. The width of the electrodes is approximately 4 μm and the distance between the neighboring electrodes is approximately 6 μm. The cell gap between the top and bottom substrates is approximately 4 μm. The repeated unit pixel size of the bending-shaped structure is approximately 42 μm×94 μm. A positive $\Delta\in$ liquid crystal material such as MLC-6692 (from Merck) was used for simulations of the first embodiment. The liquid crystal parameters are: birefringence Δn=0.085 under the wavelength of 550 nm, dielectric anisotropy Δϵ=10.3 and rotational viscosity $\gamma_1$=0.1 Pa·S. In the initial state, the liquid crystal has homogenous alignment and the azimuthal angle is 0° and the pretilt angle is 2°.

Figure 5:
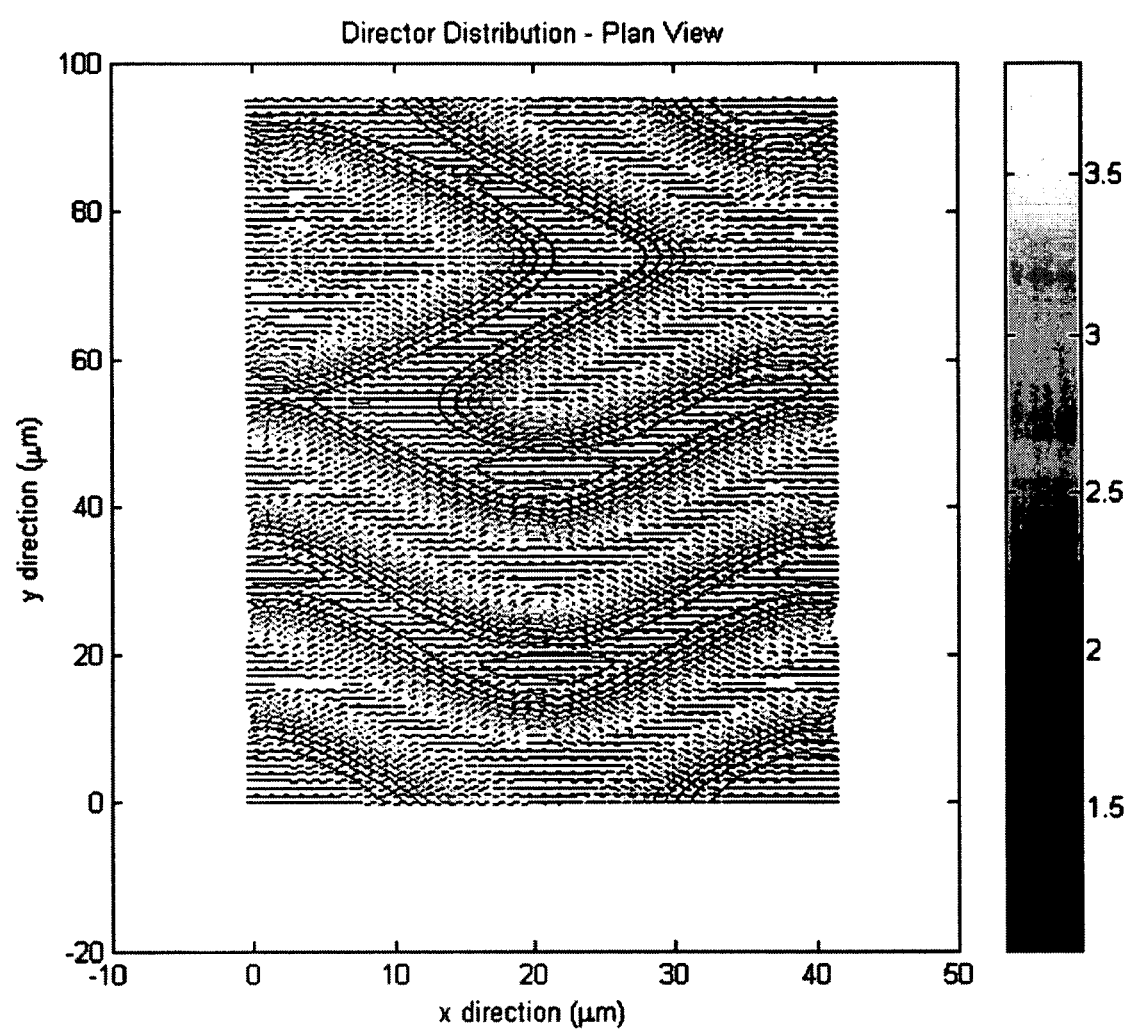
FIG. 5 shows the simulated LC director distribution of the chevron-shaped MD-IPS mode using homogeneously aligned liquid crystal materials.

FIG. 5 is a plan view of the simulated LC director distribution according to the first embodiment using homogeneously aligned liquid crystal material, such as Merck MLC-6692 Δn=0.085, Δϵ=10.3 and $\gamma_1$=0.1 Pa·S, as an example, at an applied voltage of approximately 5 $V_{rms}$. The LC directors are reoriented along the direction of the electric field due to the in-plane field effect. From the plan view, the LC directors above the pixel and common electrodes are reoriented and separated into the different alignment domains based on the bending tips of the respective chevron-shaped electrodes A multi-domain structure is formed and there is no evident discontinuity or boundary formation between the different electrode series with the different patterning directions.

Figure 6:
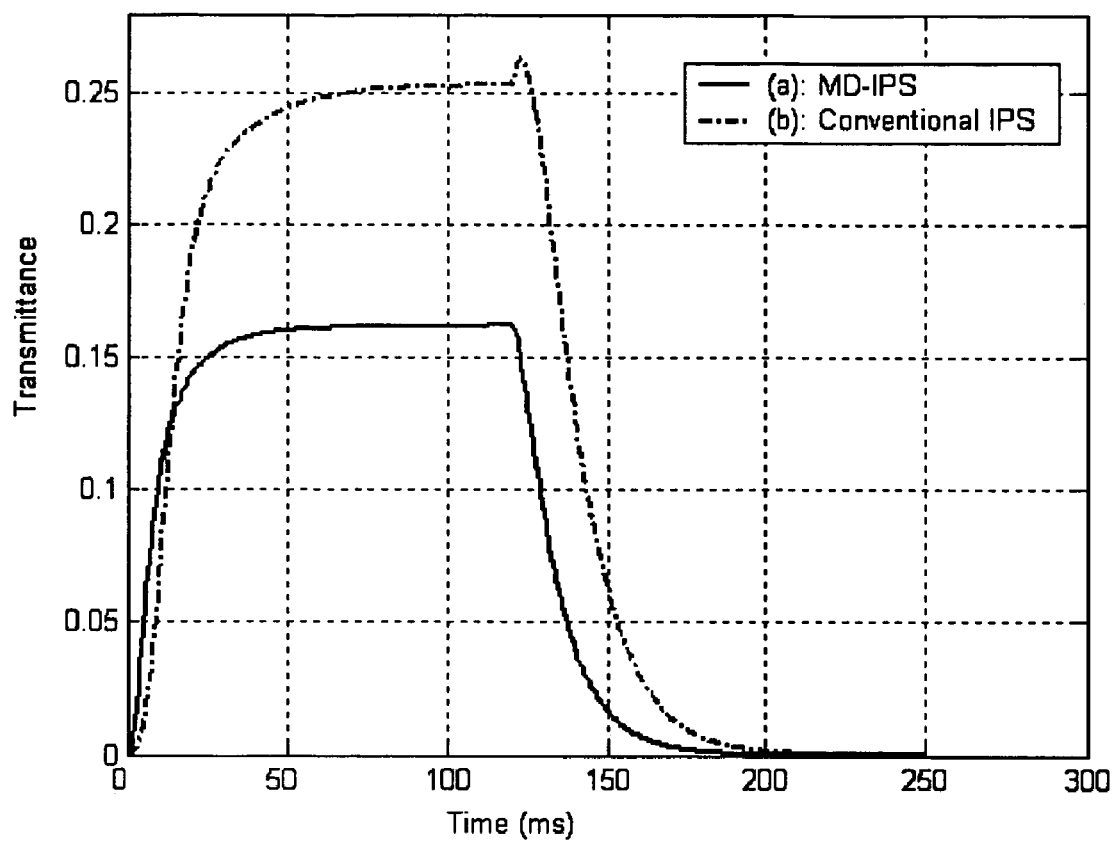
FIG. 6 is a graph showing the time-dependent transmittance of the IPS mode using homogeneously aligned liquid crystal materials under the crossed linear polarizers for the chevron-shaped multi-domain in-plane-switching mode and a conventional in-plane-switching mode.

FIG. 6a is a graph showing the time-dependent transmittance of the chevron-shaped multi-domain in-plane-switching mode using homogeneously aligned liquid crystal material such as Merck MLC-6692 (described above) at an applied voltage of approximately 5 $V_{rms}$. For comparison purpose, the conventional in-plane-switching mode is used as the benchmark, where the electrode width is approximately 4 μm and the distance between electrodes is approximately 6 μm while the liquid crystal materials and other device parameters are the same as used for the multi-domain in-plane-switching mode of the present invention. The graph in FIG. 6b shows the time-dependent transmittance of the conventional in-plane-switching mode.

The transmittance of the multi-domain in-plane-switching mode of the present invention is decreased in comparison to the conventional in-plane-switching mode because the effective optical retardation of the liquid crystal is decreased or eliminated when the multi-domain is formed in the multi-domain in-plane-switching mode. The light transmittance is improved when an increased voltage is applied and a high birefringence liquid crystal material is used as described by S. T. Wu and D. K. Yang, Reflective Liquid Crystal Displays, Wiley, Chichester, (2001). Also, the rise time of the multi-domain in-plane switching mode according to the present invention is decreased to approximately 18 ms in comparison to 40 ms for conventional in-plane-switching when the rise time is calculated from 10% to 90% transmission stage.

Figure 7A:
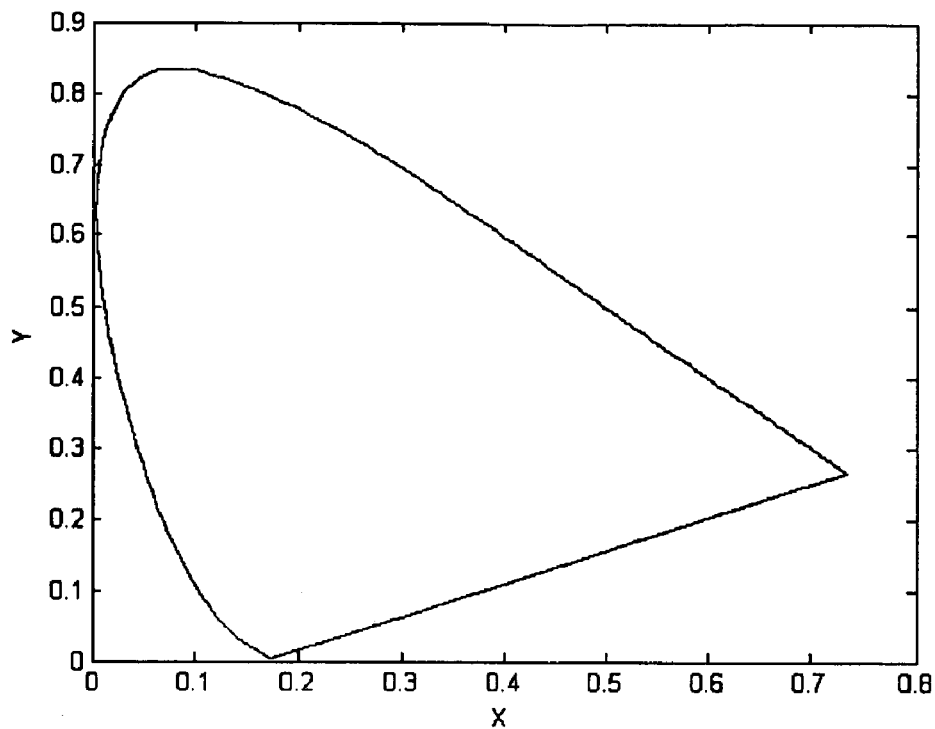
FIG. 7a is a graph showing the color shift of the in-plane-switching mode using homogeneously aligned liquid crystal materials of the chevron-shaped multi-domain in-plane-switching mode.
Figure 7B:
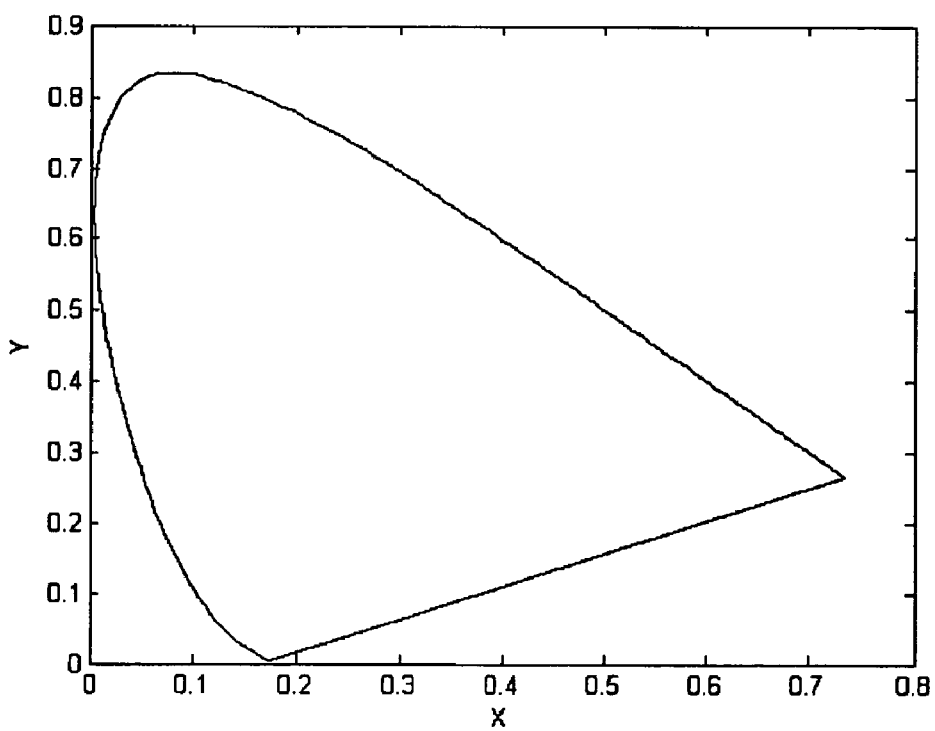
FIG. 7b is a graph showing the color shift of the conventional in-plane-switching mode.

FIGS. 7a and 7b are graphs of the color shift of the chevron-shaped multi-domain in-plane-switching mode (FIG. 7a) and the conventional in-plane-switching mode (FIG. 7b) using homogeneously aligned liquid crystal material MLC-6692 under the CIE 1931 chromaticity diagram. In this example, the applied voltage is 5 $V_{rms}$ and the white light source is scanned at the incident angle of 50° over the entire azimuthal range. A blue-shift and yellow-shift phenomena is evident in the conventional in-plane-switching mode as shown in FIG. 7b while no obvious color-shift is observed for the multi-domain in-plane-switching mode according to the present invention due to the formation of the multi-domains which suppress the color-shift spatially in approximately every direction.

Figure 8A:
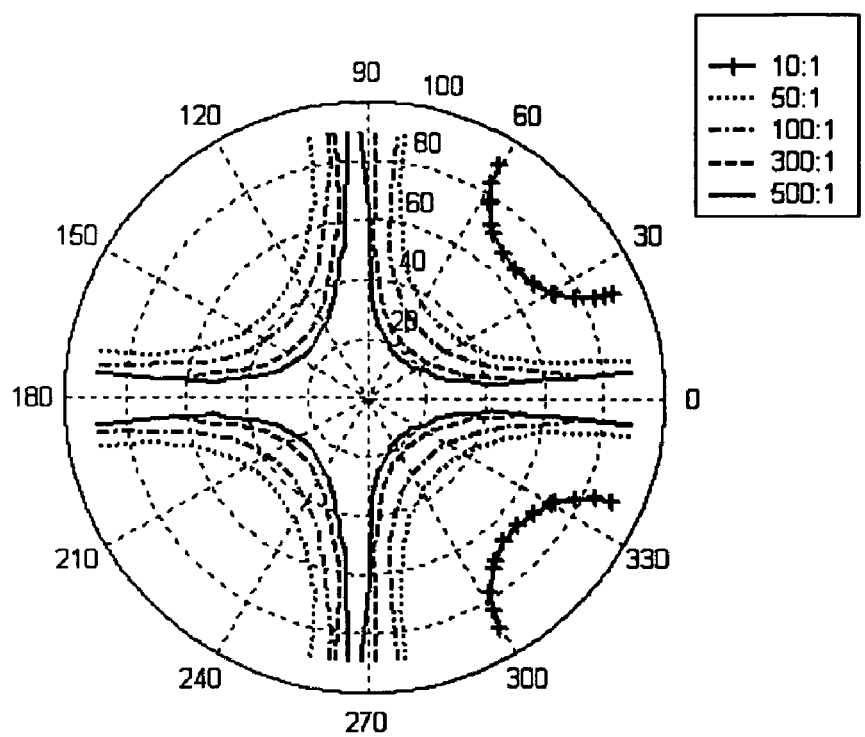
FIG. 8a shows the view angle of the in-plane-switching mode using homogeneously aligned liquid crystal materials without compensation films for the chevron-shaped multi-domain in-plane-switching mode.
Figure 8B:
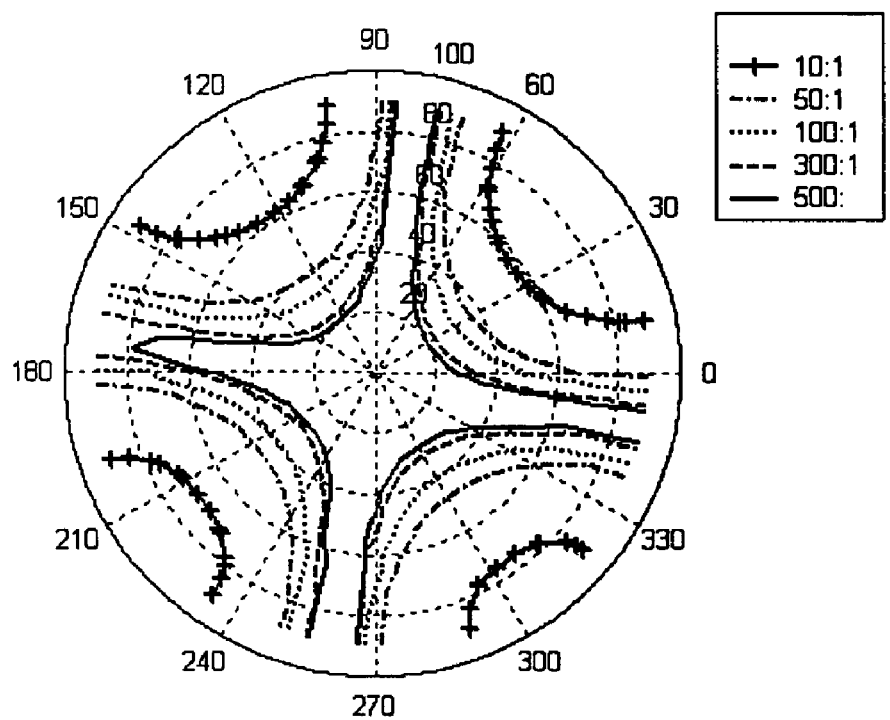
FIG. 8b shows the view angle of the in-plane-switching mode using homogeneously aligned liquid crystal materials of the conventional in-plane-switching mode.

FIG. 8 shows the viewing angle of the different in-plane-switching modes using homogeneously aligned liquid crystal material MLC-6692 with an applied voltage of approximately 5 $V_{rms}$ without the application of compensation films. FIG. 8a is a graph showing the viewing angle of the chevron-shaped multi-domain in-plane-switching mode. The viewing angle has a high contrast ratio of 500:1 within a view cone of approximately ±20° and an iso-contrast bar of approximately 10:1 which is expanded above approximately ±70°. In contrast, the viewing angle of the conventional in-plane switching mode is narrower, approximately ±60° for a 10:1 iso-contrast bar demonstrating that multi-domain in-plane-switching mode LCD of the present invention includes an inherently wider viewing angle than a LCD using the conventional in-plane-switching mode.

Figure 9:
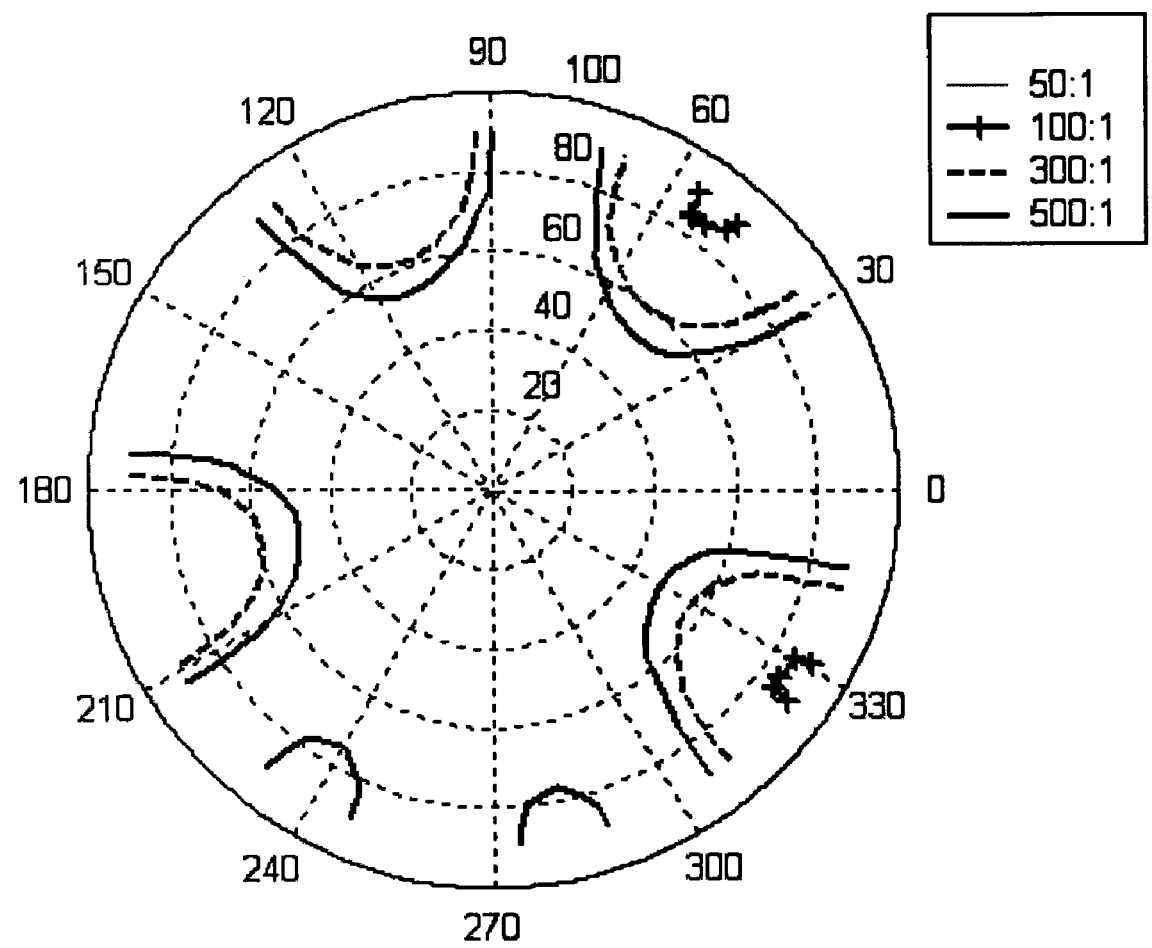
FIG. 9 show the view angle of the chevron-shaped multi-domain in-plane-switching mode using homogeneously aligned liquid crystal materials with the compensation films of positive a-plate and c-plate at $\Delta n \cdot d = 139.5$ nm and 94.0 nm before the analyzer, respectively.

Uniaxial films or biaxial films are helpful in widening the viewing angle of homogeneous LC cells. However, the design of the compensation films and device configuration provides different effects. For example, a positive a-plate and positive c-plate is used as the compensation films to achieve the improved viewing angle ability of the multi-domain in-plane-switching mode with the linear polarizers. The combination of the a-plate and the c-plate compensation films are optimized at d·Δn value of approximately 139.5 nm and approximately 94.0 nm, respectively, which are added before the analyzer 212. The contrast ratio improvement is calculated between approximately 0 $V_{rms}$ and approximately 5 $V_{rms}$. As shown in FIG. 9, the resulting multi-domain in-plane-switching mode LCD has a high contrast ratio that is better than 500:1 approximately at the center. Within a view cone of approximately ±50°, the iso-contrast bar is approximately 500:1. An iso-contrast bar of 100:1 on both the right-left region and the up-down region has been reaching out of ±85°, which demonstrates that the device has a wide viewing angle of above ±80° even with an excellent contrast ratio of 100:1. In combination with the advantages of its fast response time, super-wide view angle and high contrast ratio, the chevron-shaped MD-IPS LCD of the present invention using the homogeneously aligned liquid crystals is particularly beneficial for liquid crystal TV and monitor applications.

Embodiment 2

As previously described, FIG. 3 illustrate a typical chevron-shaped electrode structure and corresponding general device structure of a chevron-shaped multi-domain in-plane-switching LCD using vertically aligned liquid crystals. The electrode structure consists of the chevron-shaped electrodes in the horizontal and vertical directions which divide the electrode structure into at least two regions. A series of chevron-shaped common electrodes and chevron-shaped common electrodes are alternately arranged to form the inter-digital electrodes one of the substrates and are connected to the thin-film transistors. The chevron-shaped common electrode and the chevron-shaped pixel electrode can be formed using the same photolithography process, or prepared respectively and separated by passivation layers such as $SiO_2$. At the boundary between regions, the chevron-shaped common electrodes and the chevron-shaped pixel electrodes occupy adjacent space for the fully transverse switching to improve the transmittance and the aperture ratio. An additional electrode or spacers for separation are not required. The bending angle θ of the chevron-shaped electrodes, which is the angle between the chevron arm extension direction and the horizontal or vertical direction, is theoretically any non-zero value. Since the liquid crystal molecules are vertically aligned, a rubbing process is not required.

In the second embodiment of the present invention, a chevron-shaped electrode bending angle θ of approximately 10° and a chevron arm length of approximately 21 μm are selected. In this embodiment, the width of the electrodes is approximately 4 μm and the distance between the neighboring electrodes is approximately 8 μm and the cell gap between the top and bottom substrates is approximately 4 μm. The repeated unit pixel size of the bending-shaped structure is approximately 40 μm×86 μm. A positive Δϵ liquid crystal material MLC-6876-100 (from Merck) is used for this embodiment. The liquid crystal parameters are: birefringence $\Delta n=0.105$ under the wavelength of 550 nm, dielectric anisotropy $\Delta \in =16$ and rotational viscosity $\gamma_1=0.09$ Pa·S. The liquid crystal has homogenous alignment in the initial state and its azimuthal angle is approximately 0° and the pretilt angle is approximately 90°.

Figure 10:
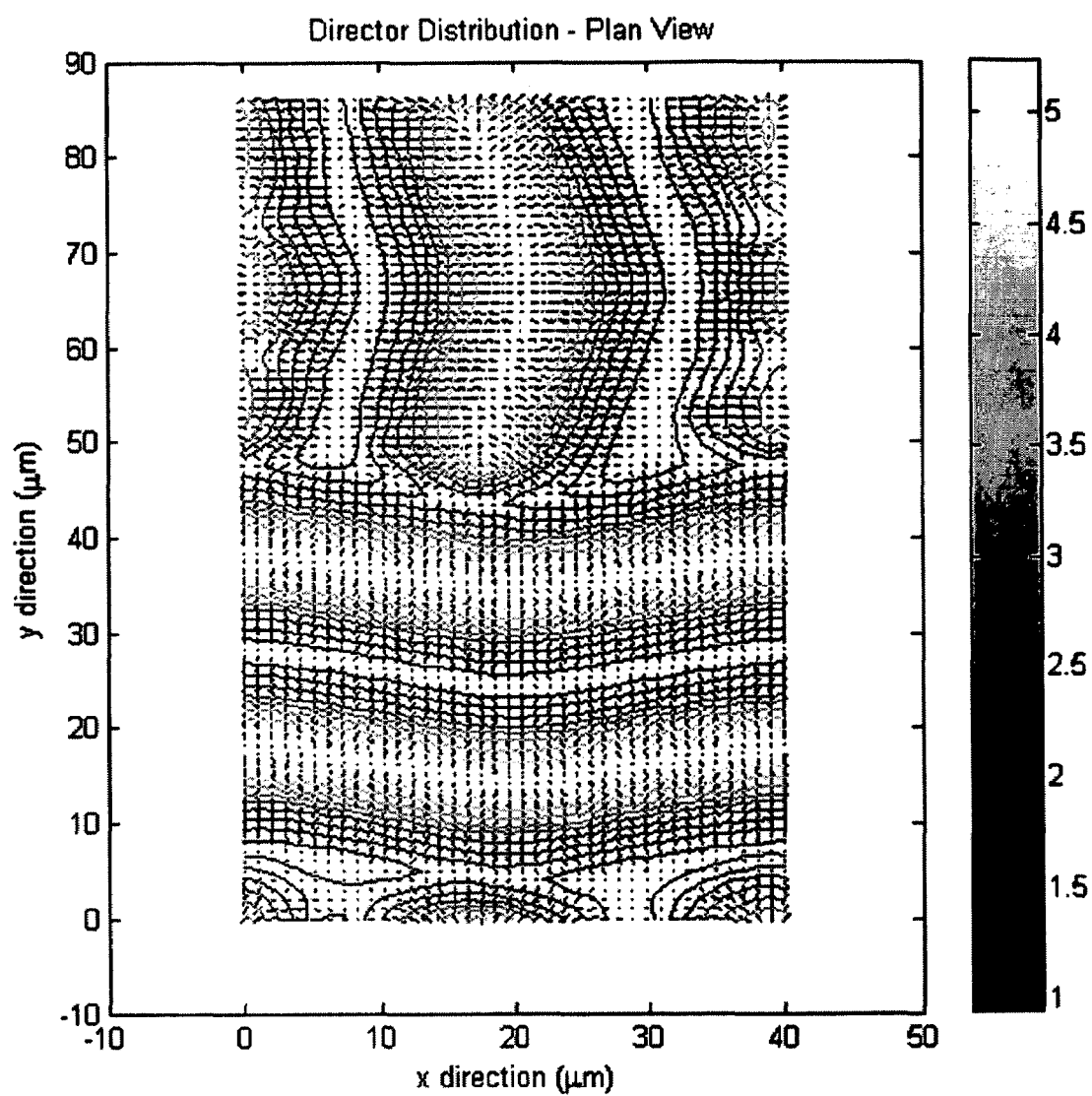
FIG. 10 shows the simulated LC director distribution of the chevron-shaped multi-domain in-plane-switching mode using vertically aligned liquid crystal materials.

The second embodiment is different from the first embodiment which described chevron-shaped multi-domain in-plane-switching mode using the homogenously aligned LCs wherein the elastic constant, $k_{22}$, is twisted. The multi-domain in-plane-switching in the second embodiment uses vertically aligned liquid crystals with an elastic constant, $k_{33}$, that is bent. Since the absolute value of $\Delta \in$ in positive liquid crystals is larger than that of the negative liquid crystals, relatively higher driving voltage is required in comparison to the conventional vertical alignment mode that uses negative liquid crystal materials. FIG. 10 illustrates the liquid crystal director distribution for the second embodiment using Merck MLC-6876-100: $\Delta n=0.105$, $\Delta \in =16.0$ and $\gamma_1=0.09$ Pa·S with an applied voltage of approximately 6.5 $V_{rms}$. The liquid crystal directors are bent and reoriented along the direction of the electric field due to the in-plane field effect. FIG. 10 shows the liquid crystal directors above the pixel and common electrodes reoriented and separated into different alignment domains based on the bending tips of the respective chevron-shaped electrodes. This demonstrates that a multi-domain liquid crystal structure has been formed.

Figure 11:
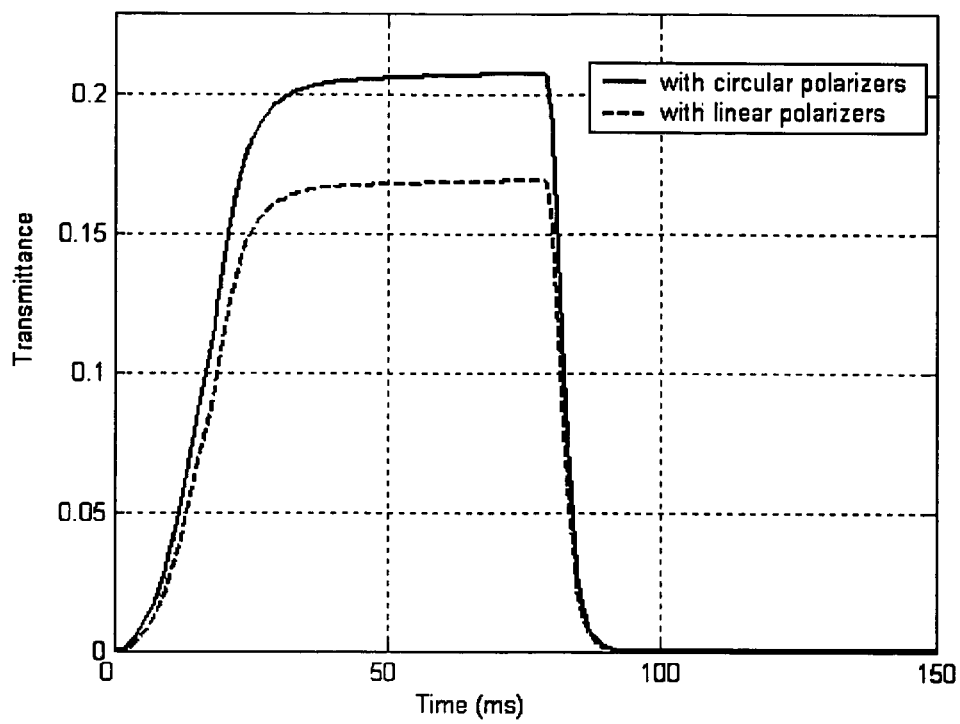
FIG. 11 is a graph showing the time-dependent transmittance of the chevron-shaped multi-domain in-plane-switching mode under the different polarizers using vertically aligned liquid crystal materials.

FIG. 11 is a graph of the time-dependent transmittance of the vertical alignment multi-domain in-plane-switching mode under the different polarizers. The liquid crystal material in this example is Merck MLC-6876-100 and the applied voltage is approximately 6.5 $V_{rms}$. As shown, when circular polarizers are applied, the light transmittance increases from the 17% with linear polarizers to 21%, which is 23.5% improvement in the light efficiency. A fast response time of less than 25 ms including the rising period from 10% light transmission to 90% and the decaying period from 90% light transmission to 10% is achieved for both the linear polarizers and the circular polarizers.

Figure 12:
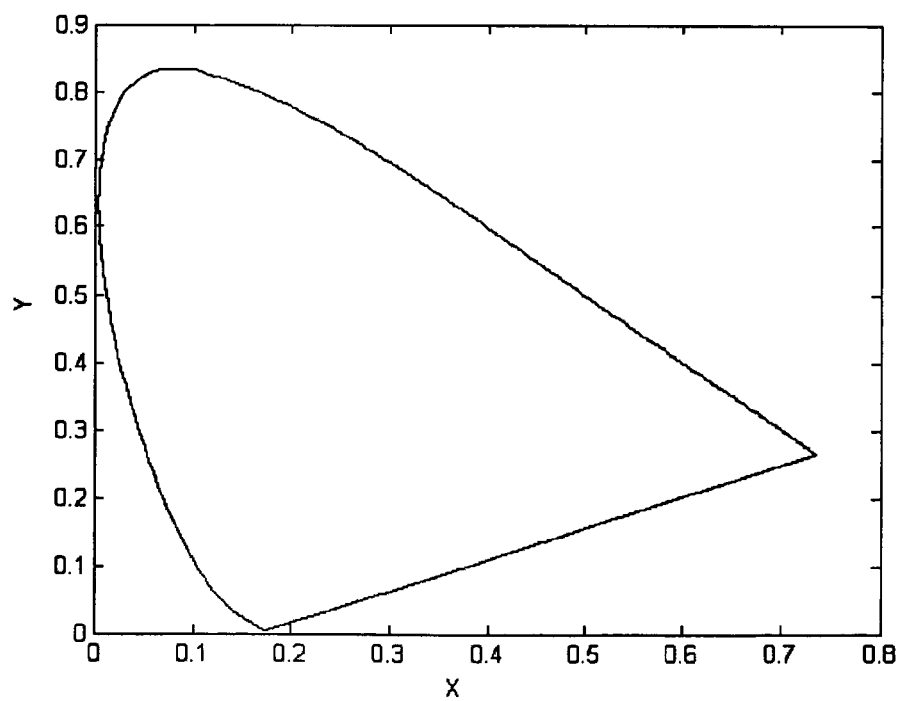
FIG. 12 shows the color shift of the chevron-shaped MD-EPS mode under the different polarizers using vertically aligned liquid crystal materials under CIE 1931 chromaticity diagram.

FIG. 12 is a graph showing the color shift of the vertical alignment multi-domain in-plane switching mode using liquid crystal material MLC-6876-100 under the CIE 1931 chromaticity diagram. In this example, the applied voltage is 6.5 $V_{rms}$ and the white light source is scanned at the incident angle of 50° in the whole azimuthal range. As shown, no obvious color-shift is observed in the proposed vertical alignment multi-domain in-plane switching mode, which attributes to the formation of multi-domains that suppress the color-shift issue completely and helps overcome the color reversal problem during the gray-scale image display.

Figure 13:
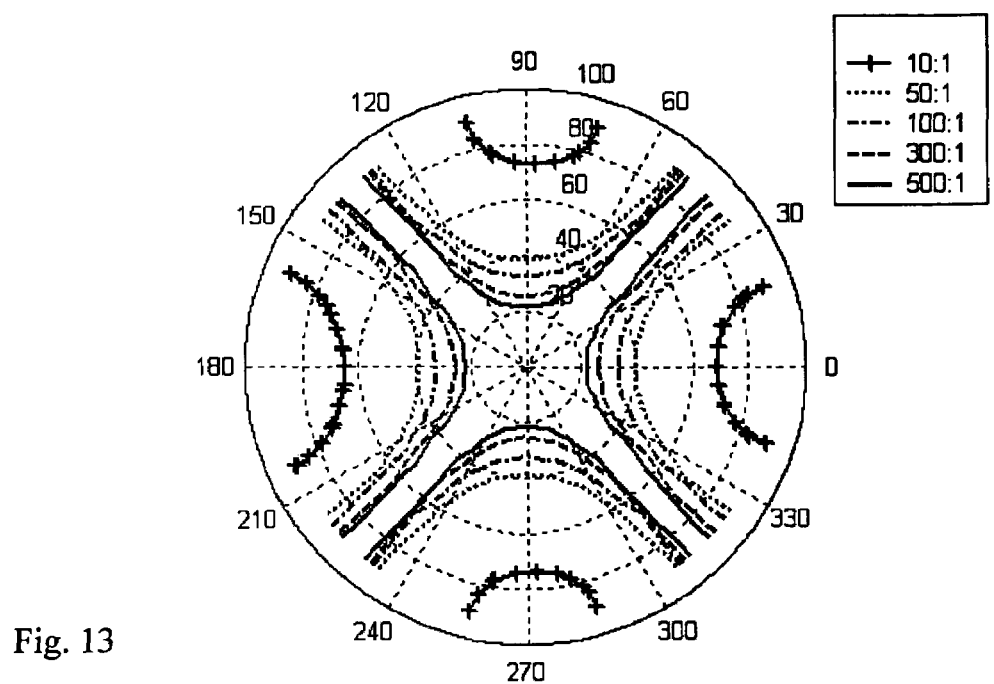
FIG. 13 shows the view angle of the chevron-shaped multi-domain in-plane-switching mode under the crossed linear polarizers using vertically aligned liquid crystal material with the compensation films of negative c-plate and positive a-plate at $\Delta n \cdot d = -204.7$ nm and 16.8 nm before the analyzer, respectively.

As discussed by Wu, a uniaxial and a negative birefringence films or biaxial films are needed for a vertical alignment mode to exhibit a wide viewing angle. For example, a negative c-plate and positive a-plate are used as the compensation films to show the view angle ability of the vertical alignment multi-domain in-plane-switching device with the linear polarizers of the present invention. A c-plate and an a-plate compensation film are added at the d$\Delta$n value of −204.7 nm and 16.8 nm before the analyzer 212, respectively. The liquid crystal material used in this example is MLC-6876-100 and the contrast ratio is calculated between 0 $V_{rms}$ and 6.5 $V_{rms}$. As shown in FIG. 13, the device has a high contrast ratio that is better than 500:1 near the center area. The iso-contrast bar of 500:1 is at about ±20° and symmetric in the vertical and horizontal directions. The viewing cone of 10:1 is larger than ±70° can be further expanded using optimized compensation films.

Embodiment 3

FIG. 4 is a plan view of a general electrode structure of a chevron-shaped multi-domain in-plane-switching liquid crystal display with two uniformly aligned liquid crystal domains. The electrode structure consists of the chevron-shaped electrodes in both the horizontal and vertical directions which divides the electrode structure into at least two different regions as previously discussed in the first embodiment.

The electrode structure is divided into two parts with the different liquid crystal aligning directions, which is usually perpendicular to each other and as shown in FIG. 4 where the arrows indicate the LC alignment directions. The two initial aligned LC domains can be obtained by double rubbing method, photo-alignment method or the inkjet printing process. Since the double multi-domain in-plane-switching liquid crystal display can be regarded as two separate in-plane-switching liquid crystal display operating simultaneously, its operational mechanism is similar to the above described multi-domain in-plane-switching liquid crystal display using the homogeneously aligned liquid crystals as shown in FIG. 3. When the principal axis of the linear polarizer is parallel to the liquid crystal alignment direction in one aligned liquid crystal domain, it is perpendicular to the other liquid crystal alignment direction.

Like to the first and second embodiment, the bending angle θ of the chevron-shaped electrodes can be theoretically any non-zero value. For high transmittance the bending angle θ preferably less than approximately 45° and the rubbing direction is preferably in the horizontal or vertical direction, which is either 0° or 90° corresponding to the two different aligned regions, for the symmetric multi-domain formation.

In this third embodiment of the invention, a bending angle of approximately 10° is selected with rubbing angles at approximately 0° and approximately 90° corresponding to the top and bottom aligned regions, respectively. The chevron arm length is 21 μm and the width of the electrodes is 4 μm with a distance between neighboring electrodes of approximately 8 μm and having a cell gap between the top and bottom substrates of approximately 4 μm. The repeated unit pixel size of the bending-shaped structure is approximately 40 μm×86 μm. A positive $\Delta \in$ LC material such as MLC-6692 was used for this example. The liquid crystal parameters are: birefringence $\Delta n=0.085$ under the wavelength of approximately 550 nm, dielectric anisotropy $\Delta \in =10.3$ and rotational viscosity $\gamma_1=0.1$ Pa·S. The selected liquid crystal has homogenous alignment in the initial state and its pretilt angle is 2° for this embodiment.

Figure 14:
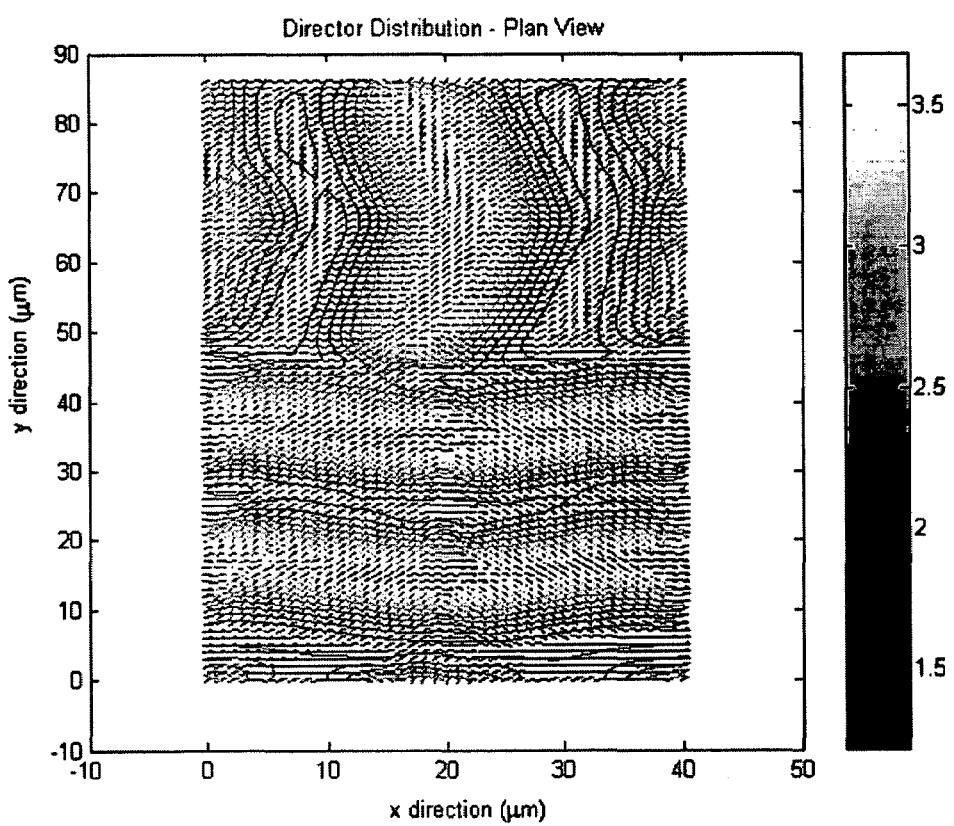
FIG. 14 shows the simulated liquid crystal director distribution of the chevron-shaped multi-domain in-plane-switching mode with two uniformly aligned liquid crystal domains.

FIG. 14 shows the liquid crystal director distribution of the chevron-shaped multi-domain in-plane-switching mode with two uniformly aligned LC domains. The liquid crystal material MLC-6692 is used as an example with an applied voltage of approximately 5 $V_{rms}$. The liquid crystal directors reorient along the electric field direction due to the in-plane field effect. As shown in the plan view of FIG. 3, the LC directors above the pixel and common electrodes are reoriented and separated into the different alignment domains based on the bending tips of the respective chevron-shaped electrodes, forming the multi-domain structure. Even though the proposed double multi-domain in-plane-switching mode can be regarded as the combination of two individual in-planeswitching modes without evidence of discontinuity on the neighboring boundary that separates the two different initial alignment domains.

Figure 15:
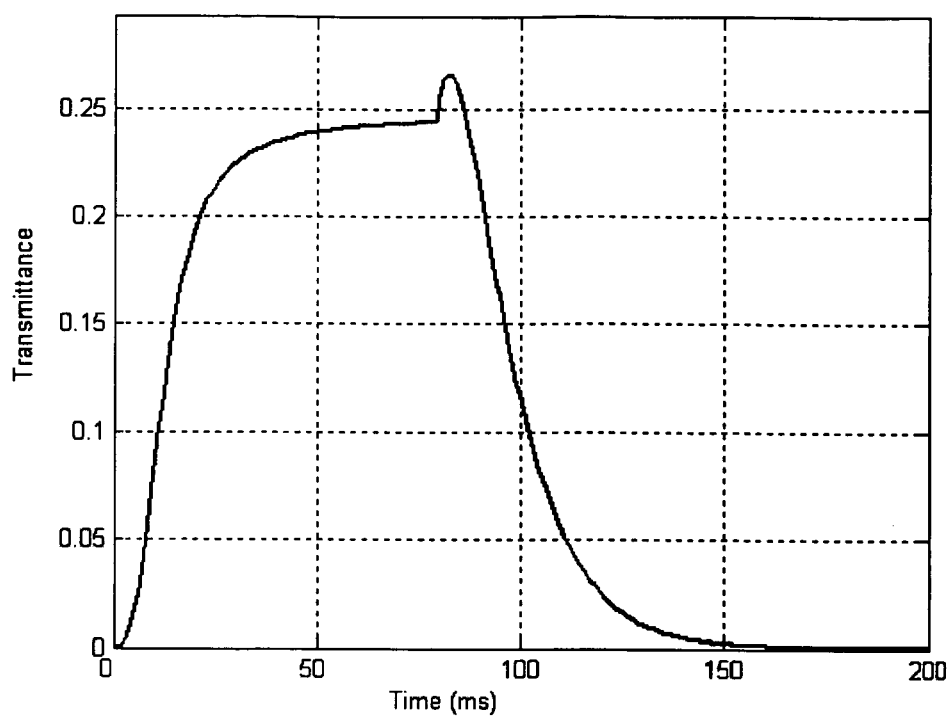
FIG. 15 is a graph showing the time-dependent transmittance of the chevron-shaped multi-domain in-plane-switching mode with two uniformly aligned liquid crystal domains under the crossed linear polarizers.

FIG. 15 is a graph of the time-dependent transmittance of the double multi-domain in-plane-switching mode under the crossed linear polarizers with an applied voltage of approximately 5 $V_{rms}$ using MLC-6692 as the liquid crystal material. The light transmittance is 24.3% which is comparable to that of the conventional in-plane-switching mode using the zig-zag shaped electrode and is approximately a 50% improvement over the multi-domain in-plane-switching with one uniformly aligned domain in the light efficiency as described in the first and second embodiments.

Figure 16:
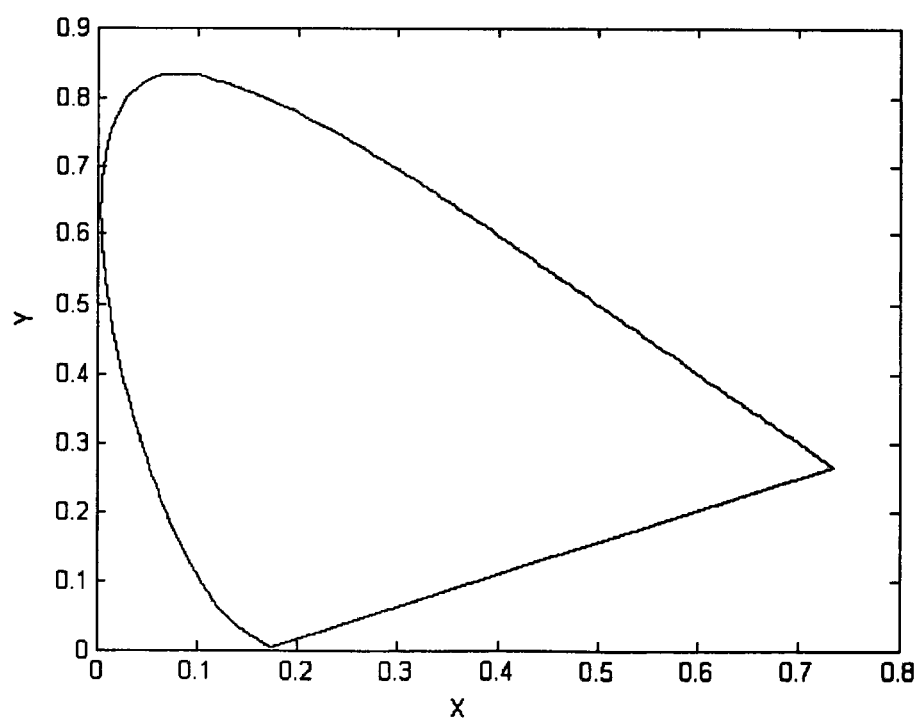
FIG. 16 shows the color shift of the chevron-shaped multi-domain in-plane-switching mode with two uniformly aligned LC domains using liquid crystal material under CE 1931 chromaticity diagram.

FIG. 16 is a graphical representation of the color shift of the proposed double multi-domain in-plane-switching mode using liquid crystal material such as Merck MLC-6692. As in the previous examples, the applied voltage is approximately 5 $V_{rms}$ and the white light source is scanned at the incident angle of 50° in the whole azimuthal range. As shown, there is no obvious color-shift observed in the double multi-domain in-plane-switching mode. The results are attributed to the formation of multi-domains that eliminates the color-shift issue. Thus, the double multi-domain in-plane-switching mode of the present invention is useful in overcoming the color reversal problem for the gray-scale image display.

Figure 17:
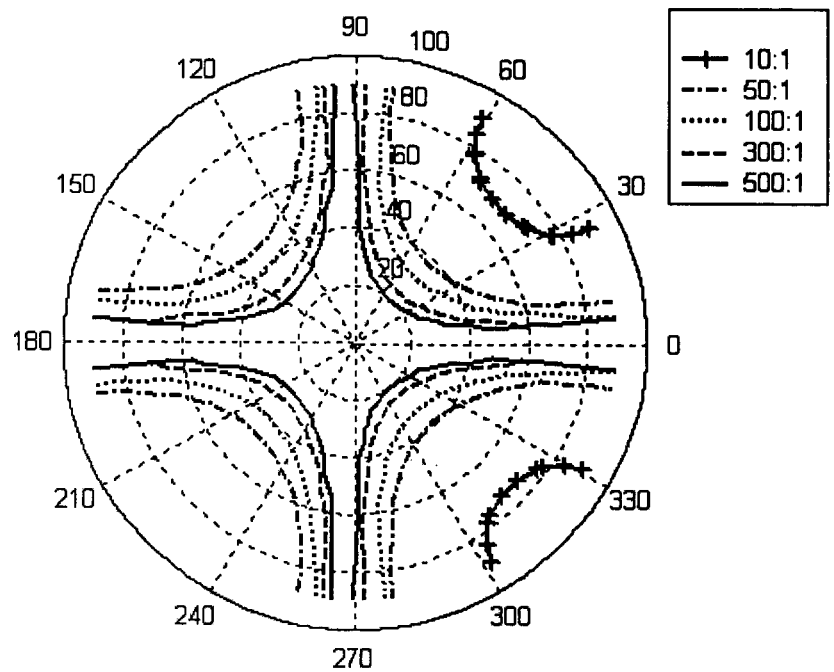
FIG. 17 shows the view angle of the chevron-shaped multi-domain in-plane-switching mode with two uniformly aligned LC domains using liquid crystal material without compensation films.

FIG. 17 shows the view angle of the proposed double MD-IPS mode with two uniformly aligned LC domains using liquid crystal material Merck MLC-6692 at 5 $V_{rms}$ without compensation films. It has a high contrast ratio of 500:1 at the view cone of ±20° and the iso-contrast bar of 10:1 is expanded above ±70°. This viewing angle ability is better than the conventional IPS mode.

Figure 18:
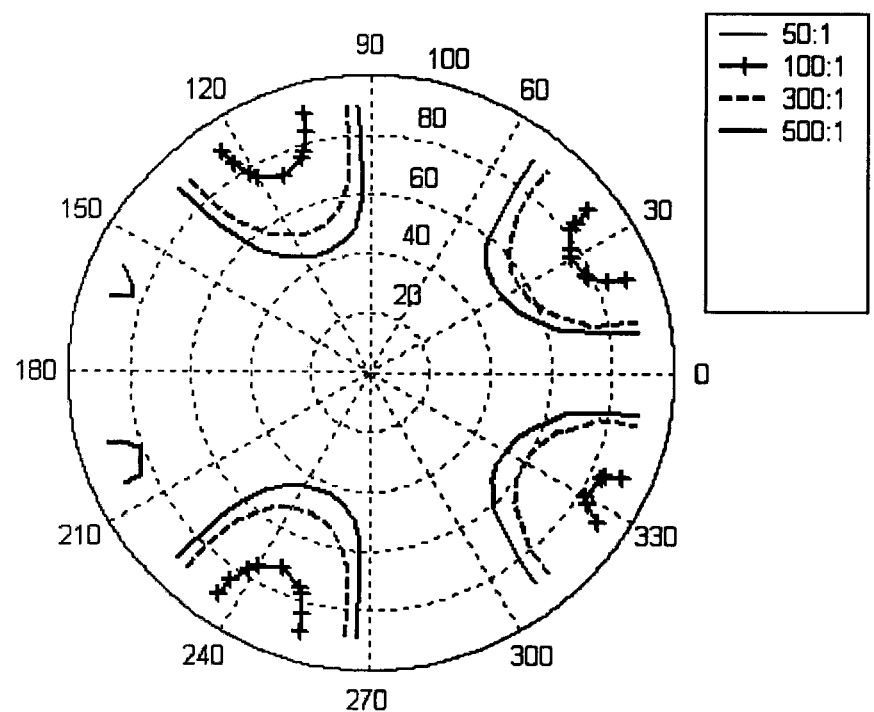
FIG. 18 shows the view angle of the chevron-shaped multi-domain in-plane-switching mode with two uniformly aligned liquid crystal domains using liquid crystal material with the compensation films of positive a-plate and c-plate at $\Delta n \cdot d = 141.2$ nm and 94.1 nm before the analyzer, respectively.

To further enlarge the viewing angle of the double multi-domain in-plane-switching mode, a positive a-plate and positive c-plate are used as compensation films. The a-plate and c-plate compensation films are optimized at d·Δn value of approximately 141.2 nm and approximately 94.1 nm, respectively, which are added before the analyzer. The calculated contrast ratio is between approximately 0 $V_{rms}$ and approximately 5 $V_{rms}$. As shown in FIG. 18, the double multi-domain in-plane-switching liquid crystal display using MLC-6692 for example, has a high contrast ratio that is better than 500:1 near the center. The iso-contrast bar of 500:1 is approximately ±50° and the contrast ratio is maintained at approximately 500:1 on both the horizontal and the vertical directions. The double multi-domain in-plane-switching liquid crystal display of the present invention has a wide viewing angle at approximately ±80° with a contrast ratio of approximately 100:1. Therefore, the double multi-domain in-plane-switching liquid crystal display has the benefits of high transmittance, high contrast ratio, low color shift and a wide viewing angle, which is advantageous for the practical liquid crystal display applications.

Although the invention has been described with a certain degree of detail, it is to be understood that the present disclosure is just been made to demo and describe our idea only, the numerous changes of the detailed construction and combination as well as the arrangement of the parts will also be included in the art of the invention.

We claim:

1. A multi-domain in-plane switching liquid crystal display comprising:
    a first substrate and a second substrate;
    a chevron shaped electrode structure including plural chevron-shaped pixel electrodes interleaved with plural chevron-shaped common electrodes in both a horizontal and vertical direction on only one of said first substrate and said second substrate, wherein said interleaved plural chevron-shaped pixel and common electrodes divide said electrode structure of each pixel into at least two different regions;
    a first and a second alignment layer on an interior surface of each of said first substrate and said second substrate, respectively;
    an anisotropic liquid crystal material sandwiched between said first substrate and said second substrate to form a liquid crystal cell, wherein said first and said second alignment layers are adjacent to said liquid crystal material to provide alignment of said liquid crystal material; and
    a first and a second polarizer disposed on an exterior surfaces of said first substrate and said second substrate, wherein said multi-domain in-plane switching liquid crystal display has a multi-domain liquid crystal distribution where one is in a horizontal direction and another is in a vertical direction due to the chevron-shaped electrode structure with small color shift, wide viewing angle and fast response.

2. The multi-domain in-plane switching liquid crystal display of claim 1, wherein a bending angle of each of said chevron-shaped electrodes is within a range of approximately 0 degrees to approximately 90 degrees, wherein said bending angle is an angle between a chevron arm extensional direction and one of a horizontal and a vertical direction.

3. The multi-domain in-plane switching liquid crystal display of claim 1, wherein said first and said second polarizer are linear and said liquid crystal material is homogenously aligned in one of a horizontal direction and a vertical direction corresponding to said at least two different regions of said electrode structure, when an outer driving voltage is applied the homogeneously or vertically aligned liquid crystals are rotated by a transverse electric filed from the chevron-shaped electrodes so that a light passes through the crossed polarizers due to the change of a phase retardation of the liquid crystals.

4. The multi-domain in-plane switching liquid crystal display of claim 2, wherein said bending angle is preferably approximately 45 degrees.

5. The multi-domain in-plane switching liquid crystal display of claim 1 wherein said first and said second polarizer are linear polarizers, wherein said liquid crystal material is vertically aligned such that a principal axis of one of said first and said second polarizer is parallel to an alignment direction of said liquid crystal material and on an opposite one of said first and said second polarizer is approximately perpendicular to said alignment direction.

6. The device of claim 1 wherein said first polarizer and said second polarizer are circular polarizers, said device further comprising:
    a first and a second broadband quarter-wave compensation film between said first and said second alignment film and a corresponding one of said first and said second polarizer, respectively, wherein said liquid crystal material is vertically aligned.

7. The multi-domain in-plane switching liquid crystal display of claim 1, wherein the said plural chevron-shaped electrodes are one of a transparent indium tin oxide (ITO) layer and an electric conductive film.

8. The multi-domain in-plane switching liquid crystal display of claim 1, wherein said liquid crystal material has a positive (Δ∈>0) dielectric anisotropy.

9. The multi-domain in-plane switching liquid crystal display of claim 1, wherein said liquid crystal material has a negative (Δ∈<0) dielectric anisotropy.

10. The multi-domain in-plane switching liquid crystal display of claim 1, further comprising:
    at least one compensation film disposed between one of said first and said second polarizer and a corresponding one of said first substrate and said second substrate.

11. The multi-domain in-plane switching liquid crystal display of claim 10, wherein said compensation films is a combination of a positive birefringence and a uni-axial birefringence to provide said wide viewing angle.

12. The multi-domain in-plane switching liquid crystal display of claim 10, wherein said compensation films is a combination of a negative birefringence and a uni-axial birefringence to provide said wide viewing angle.

13. The multi-domain in-plane switching liquid crystal display of claim 10, wherein said compensation film is one of an a-plate compensation film and a c-plate compensation film.

14. The multi-domain in-plane switching liquid crystal display of claim 10, said compensation film is a biaxial film.

15. The multi-domain in-plane switching liquid crystal display of claim 1, wherein said first and said second alignment layers provide a vertical alignment of said liquid crystal material.

16. The multi-domain in-plane switching liquid crystal display of claim 1, wherein said first and said second alignment layers provide a homogeneous alignment of said liquid crystal material.

17. The multi-domain in-plane switching liquid crystal display of claim 1, wherein said first and said second polarizers comprise:
   a linear polarizer and a wide band quarter-wave film forming a circular polarizer on one of said top and said bottom exterior surface of said first and said second substrate; and
   at least one circular polarizer on an opposite one of said at least one of said top and said bottom exterior surface.

18. The multi-domain in-plane switching liquid crystal display of claim 1, wherein said first and said second alignment layers provide homogenous liquid crystal alignment in at least two alignment directions.

* * * * *